(No Model.)
G. WHITE.
SPEED INDICATOR
No. 559,650. Patented May 5, 1896.
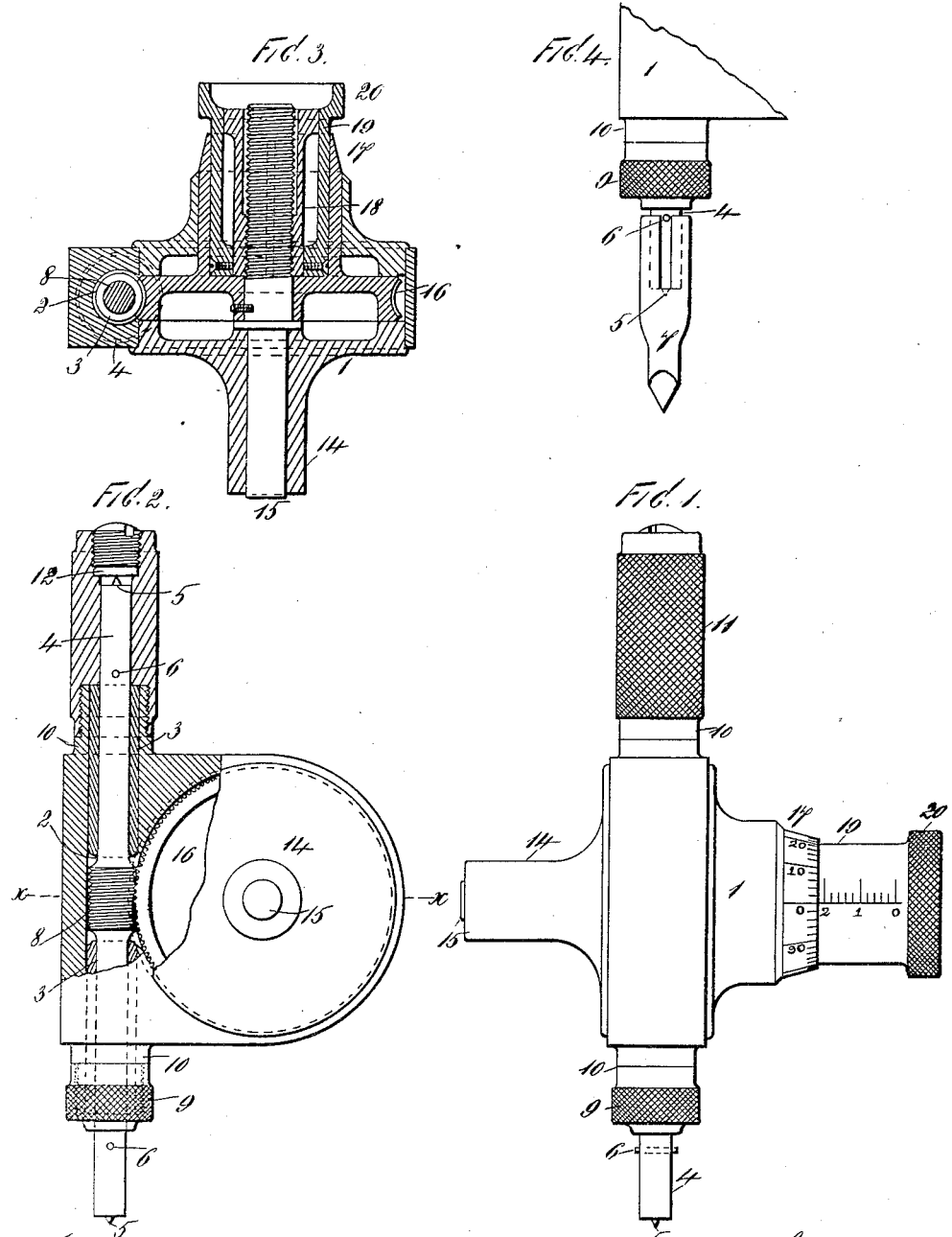

UNITED STATES PATENT OFFICE.

GEORGE WHITE, OF JERSEY CITY, NEW JERSEY.

SPEED-INDICATOR.

SPECIFICATION forming part of Letters Patent No. 559,650, dated May 5, 1896.

Application filed March 27, 1895. Serial No. 543,369. (No model.)

*To all whom it may concern:*

Be it known that I, GEORGE WHITE, a citizen of the United States, residing in Jersey City, Hudson county, State of New Jersey, have invented a new and useful Improvement in Speed-Indicators, of which the following is a specification.

My invention relates especially to devices employed for counting the rotations of a shaft or other revoluble piece of machinery, and has for its object the provision of a simple and accurate speed-counter which may be perfectly timed and started and stopped while engaging with the shaft or the equivalent wherewith it is used.

To attain the desired end, my invention consists, essentially, in a case containing a longitudinal worm arranged to rotate a gear the shaft whereof is provided with a screw engaging with a screw-threaded sleeve, said sleeve and the portion of the gear-wheel from which the sleeve extends being provided with indicating-marks, all of which will be hereinafter first fully described, and then pointed out in the claims.

In the accompanying drawings, forming a part hereof, Figure 1 is a plan view of my improved speed-counter, and Fig. 2 is a side elevation and partial longitudinal section thereof. Fig. 3 is a cross-sectional view at line $xx$ of Fig. 2. Fig. 4 is a view of the removable point of the instrument.

Like numerals of reference, wherever they occur, indicate corresponding parts in all the figures.

1 is the shell or case of the instrument, made of any preferred material. This case is perforated at 2 and provided with bearing-pieces 3, fixed in said perforation. Mounted in these bearings is a shaft 4, provided at each extremity with a point 5.

6 6 are pins passing through the shaft 4, designed for holding a removable engaging point 7 in place when the instrument is in use.

8 is a worm mounted upon or formed with the shaft 4.

9 is a nut engaging with a screw-threaded projection 10 from the case 1 and surrounding the shaft 4.

11 is a cap-piece, also arranged to engage with the projections 10, said cap being provided at its outer end with a bearing-piece 12, of ruby or the equivalent, adjustably held in place by a screw 13. By this arrangement a suitable bearing is provided to receive the thrust upon the shaft 4 when the instrument is in use, and provision is made for employing the device with mechanism revolving either to the right or left, as the cap 11 and connected parts may be quickly changed from one side of the case 1 to the other, as required.

14 is a hub wherein is journaled a shaft 15, to which is keyed a worm-wheel 16, arranged to engage with the worm 8.

17 is a hollow hub secured to or forming a part of the worm-wheel 16 and projecting out of the case 1 upon the side opposite to the hub 15. This hub 17 is graduated and marked in accordance with the ratio of the worm 8 to the teeth of the worm-wheel 16. In the present instance the number of teeth in the wheel 16 being two hundred, the worm revolves two hundred times to one of the hub 17, and consequently the hub is marked for one hundred, each short mark thereon indicating two revolutions and each long mark ten revolutions.

The shaft 15 is screw-threaded at the end opposite to the hub 14 and projects through the center of the revoluble hub 17.

18 is a screw-threaded sleeve, arranged to engage with the thread upon the shaft 15, and to the sleeve 18 is secured a thimble 19, provided with a knurled flange 20. The ratio of proportion of the thread upon the shaft 15 to the worm-wheel 16 and its hollow hub is such that when the thimble 19 is held against revolution each revolution of the worm-wheel and its shaft will force the said thimble outward one-half the space between the short lines marked upon said thimble, and consequently each long line thereon represents one thousand revolutions of the shaft 4. Of course the thimble 19 may be made of any desired length, as well as the screw-threaded portion of the shaft 15; but with a length of one inch ten thousand revolutions of the shaft 4 will be recorded, and for all ordinary purposes this is ample. The number of teeth upon the worm-wheel 16 may be varied at pleasure, as well as the thread upon the shaft 15 and in the sleeve 18, it being only necessary to mark the indications upon the hub 17 and the thimble 19 in accordance therewith.

When constructed and arranged in accordance with the foregoing description, the operation of my speed-indicator is as follows: In taking a speed the sleeve 18 is first screwed home, as in Fig. 3, the axial line thereon being placed opposite zero upon the hub 17. The point 7 of the instrument is now placed in engagement with the mechanism the rotations of which it is desired to count and firmly held there by one hand grasping the cap-piece 11. Until it is desired to time the revolutions the hub 17 and thimble 19 will revolve in unison, and when the instant arrives for taking the speed the flange 20 is grasped by the other hand of the operator and the thimble ceases to revolve, is forced outward by the screw upon the shaft 15, and commences to record the revolutions of the shaft 4. When the predetermined period of time has elapsed, the thimble 19 is released from the hand and again revolves with the hub 17, registration stopping the instant the thimble is released, and thus a perfectly accurate record is obtained.

Having now fully described my invention, what I claim as new therein, and desire to secure by Letters Patent, is—

1. A speed indicator or counter in which is comprised an inclosing case; a worm-shaft journaled in said case and provided with engaging projections; a worm-gear meshing with the above-mentioned worm, and having its protruding hub provided with indicating-marks, and a thimble carried by a screw-thread which engages with a thread upon the shaft of the worm-gear, said thimble bearing indicating-marks, and being arranged to revolve with the hub, or held against rotation therewith, substantially as shown and described.

2. In a speed-indicator, the combination with a worm-wheel having an indicating-hub, of an indicating-thimble mounted upon said hub and arranged to revolve therewith, or be held against revolution, substantially as shown and described.

3. In a speed-indicator, an indicating-hub mounted upon a revoluble worm-wheel, and a screw-threaded shaft to said wheel projecting through said indicating-hub, in combination with an indicating-sleeve adapted and arranged to revolve with said shaft, or move longitudinally thereon when held against revolution, substantially as shown and described.

GEORGE WHITE.

Witnesses:
SAMUEL D. HAINES,
A. M. PIERCE.